United States Patent
Long et al.

(10) Patent No.: US 11,816,971 B2
(45) Date of Patent: Nov. 14, 2023

(54) SYSTEM AND METHOD FOR RISK CLASSIFICATION AND WARNING OF FLASHOVER EVENTS

(71) Applicant: 3M INNOVATIVE PROPERTIES COMPANY, St. Paul, MN (US)

(72) Inventors: Andrew Long, Woodbury, MN (US); Panagiotis D. Stanitsas, Forest City, CA (US); Jerome Shanko, Jr., Matthews, NC (US); Wesley M. Barbee, Oxboro, NC (US); Matthew M. Shettel, Monroe, NC (US); Matthew Shannon, Salisbury, NC (US); Johnathan R. Graves, Gainesville, GA (US); James W. Howard, North Oaks, MN (US); James B. Snyder, Minneapolis, MN (US); James L. C. Werness, Jr., Edina, MN (US); Jason Patterson, Monroe, NC (US); Ravi Raagav Srinivas, St. Paul, MN (US); Payas Tikotekar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 280 days.

(21) Appl. No.: 17/291,172

(22) PCT Filed: Nov. 13, 2019

(86) PCT No.: PCT/IB2019/059749
§ 371 (c)(1),
(2) Date: May 4, 2021

(87) PCT Pub. No.: WO2020/100060
PCT Pub. Date: May 22, 2020

(65) Prior Publication Data
US 2021/0366255 A1    Nov. 25, 2021

Related U.S. Application Data

(60) Provisional application No. 62/760,734, filed on Nov. 13, 2018.

(51) Int. Cl.
*G08B 21/16* (2006.01)
*G01J 5/00* (2022.01)
(Continued)

(52) U.S. Cl.
CPC ............... *G08B 21/16* (2013.01); *G01J 5/00* (2013.01); *G06F 1/24* (2013.01); *G06T 7/97* (2017.01);
(Continued)

(58) Field of Classification Search
CPC ...... G08B 21/16; G08B 17/06; G08B 17/117; G08B 17/12; G01J 5/00; G01J 2005/0077;
(Continued)

(56) References Cited

U.S. PATENT DOCUMENTS

| | | | |
|---|---|---|---|
| 6,700,497 B2 | 3/2004 | Hibbs | |
| 6,995,665 B2 * | 2/2006 | Appelt | G08B 21/02 128/204.23 |

(Continued)

FOREIGN PATENT DOCUMENTS

| | | |
|---|---|---|
| CN | 106355812 | 1/2017 |
| CN | 108378450 A | 8/2018 |

(Continued)

OTHER PUBLICATIONS

International Search Report for PCT International Application No. PCT/IB2019/059749, dated Feb. 25, 2020, 3 pages.

*Primary Examiner* — Curtis A Kuntz
*Assistant Examiner* — James E Munion
(74) *Attorney, Agent, or Firm* — Kenneth B. Wood

(57) ABSTRACT

A system, wearable device and management device provided for predicting a flashover event. According to one aspect of the disclosure, a wearable device for predicting a flashover event is provided. The wearable device includes at least one thermal sensor configured to generate thermal data associated with an environment, and processing circuitry configured to: determine a risk of ignition of at least one combustible gas in the environment based on the thermal (Continued)

data, and trigger at least one action based on the determined risk of ignition.

12 Claims, 12 Drawing Sheets

(51) Int. Cl.
| | | |
|---|---|---|
| G06F 18/24 | (2023.01) | |
| G06T 7/00 | (2017.01) | |
| G06V 20/20 | (2022.01) | |
| G08B 17/06 | (2006.01) | |
| G08B 17/117 | (2006.01) | |
| G08B 17/12 | (2006.01) | |
| G06F 1/24 | (2006.01) | |

(52) U.S. Cl.
CPC ............ *G06V 20/20* (2022.01); *G08B 17/06* (2013.01); *G08B 17/117* (2013.01); *G08B 17/12* (2013.01); *G01J 2005/0077* (2013.01); *G06T 2207/10048* (2013.01); *G06T 2207/20084* (2013.01)

(58) Field of Classification Search
CPC . G06F 18/24; G06T 7/97; G06T 2207/10048; G06T 2207/20084; G06V 20/20
See application file for complete search history.

(56) References Cited

U.S. PATENT DOCUMENTS

| | | | |
|---|---|---|---|
| 7,298,535 B2 | 11/2007 | Kuutti | |
| 9,498,013 B2 | 11/2016 | Handshaw | |
| 2007/0205903 A1 | 9/2007 | diMarzo | |
| 2011/0112660 A1 | 5/2011 | Bergmann | |
| 2016/0117587 A1* | 4/2016 | Yan | G06N 3/08 706/20 |

FOREIGN PATENT DOCUMENTS

| | | | |
|---|---|---|---|
| JP | 2004-102634 | 4/2004 | |
| KR | 1020180073184 | 7/2018 | |
| WO | WO 2017-212225 | 12/2017 | |
| WO | WO-2017212225 A1 * | 12/2017 | ........... A62B 17/003 |

* cited by examiner

SYSTEM AND METHOD FOR RISK CLASSIFICATION AND WARNING OF FLASHOVER EVENTS

CROSS REFERENCE TO RELATED APPLICATIONS

This application is a national stage filing under 35 U.S.C. 371 of PCT/IB2019/059749, filed Nov. 13, 2019, which claims the benefit of U.S. Provisional Patent Application No. 62/760,734 filed Nov. 13, 2018, the disclosures of which are incorporated by reference in their entirety herein.

FIELD

The present technology is generally related to fire emergency systems, and in particular to a risk classification and warning of predicted flashover events.

BACKGROUND

First responders often encounter dangerous situations during an emergency event such as a fire. Temperature measurement in fire environments can be performed in several ways. For example, ambient temperature measurement is traditionally performed with thermocouples. For training scenarios, a thermocouple "tree" where thermocouples are arranged at varying heights, can be left free-standing in an environment to measure the thermal environment as a function of height. In live fire scenarios, these devices are often too bulky to be carried and too sensitive to be effectively deployed. Mounting a thermocouple to an exterior of a first responder's gear provides a poor measure of the ambient thermal environment due to the movement (walking, crouching, crawling, climbing, etc.) patterns of first responders during search and rescue. Non-contact measurements may be performed using infrared (IR) radiation, either by performing spot measurements or through a thermal imaging camera (TIC).

Some existing systems may use these measurements to predict the existence of fire but these existing systems lack the ability to predict a flashover event. Flashover is a dangerous phenomenon that may occur during fire rescue operations. In particular, as materials (e.g., petroleum-based fabrics) burn, these materials emit one or more combustible gasses into the environment as soot and smoke. As the fire progresses, a buildup of these combustible gasses in an enclosed environment will occur, alongside with a buildup of heat. Once the gas layer of the combustible gases reaches a high enough temperature (typically around 600 degrees Celsius), the combustible gasses will auto-ignite. This auto-ignition of combustible gasses may lead to a full-scale room explosion and/or spreading of fire on a time scale of less than a minute, for example. This precipitous rise in heat released from the auto-ignition of combustible gasses may nullify protection provided by standard personal protective equipment worn by first responders, leading to serious burns and even death. Other existing systems attempt to predict flashover using various gas sensors to detect certain types of gas that may lead to flashover, but these systems add cost and complexity.

SUMMARY

Existing systems do not provide an efficient method to predict flashover events in an environment. The disclosure helps solves the problems with existing systems by providing a system, device and method for predicting flashover events. In one or more embodiments, a thermal imaging camera which may be hand-operated or helmet mounted, for example, is configured to gather thermal data of the thermal environment (e.g., room). This thermal data is analyzed using a machine learning model that, for example, dynamically predicts the risk of a flashover event or the time to flashover based on the thermal data. The predicted risk of the flashover may then be indicated to the user to alert the user of the current and/or future risk level of flashover.

In one or more embodiments, one or more infrared (IR) spot sensors are implemented to generate thermal data of the environment around a user wearing the IR spot sensors. This thermal data may be sparse but holistic. In some embodiments, the machine learning model may be trained on live and simulated fire dynamics data.

According to one aspect of the disclosure, a wearable device for predicting a flashover event is provided. The wearable device includes processing circuitry configured to: receive thermal data from at least one thermal sensor, the thermal data being associated with an environment, determine a risk of ignition of at least one combustible gas in the environment based on the thermal data, and trigger at least one action based on the determined risk of ignition.

According to one embodiment of this aspect, the at least one thermal sensor is a plurality of infrared (IR) sensors, the thermal data corresponding to data generated by the plurality of IR sensors. According to one embodiment of this aspect, the processing circuitry is further configured to determine a time-varying thermal profile based on the thermal data, the time-varying thermal profile including a plurality of characteristics of the thermal data. According to one embodiment of this aspect, the determining of the time-varying thermal profile includes: analyzing the thermal data over a predefined time window, and determining the plurality of characteristics of the thermal data based on the analysis of the thermal data over the predefined time window where the plurality of characteristics corresponding to at least one of an autocorrelation over varying lag times, maxima, minima, mean, median, variance, energy, entropy, skewness, fast fourier transform (FFT) coefficients, continuous wavelet transform (CWT) coefficients.

According to one embodiment of this aspect, the risk of ignition corresponds to a predicted time until ignition of at least one combustible gas in the environment. According to one embodiment of this aspect, the at least one action includes triggering an indication in a display associated with the wearable device where the indication includes the predicted time until ignition of at least one combustible gas in the environment. According to one embodiment of this aspect, the processing circuitry is further configured to use state estimation to track a predicted risk state of the risk of ignition for the environment based on a distribution of risk classes.

According to one embodiment of this aspect, the thermal data corresponds to a single thermal image of the environment. According to one embodiment of this aspect, the determining of the risk of ignition of at least one combustible gas in the environment includes performing a convolutional neural network classification on the thermal image. According to one embodiment of this aspect, the thermal data includes a plurality of sets of a plurality of thermal images where each set of the plurality of thermal images is captured within a respective time window. According to one embodiment of this aspect, the determining of the risk of ignition of at least one combustible gas in the environment includes performing a recurrent convolutional neural network classification on the set of the plurality of thermal images captured within a respective time window.

According to another aspect of the disclosure, a method for predicting a flashover event is provided. Thermal data is received from at least one thermal sensor where the thermal data is associated with an environment. A risk of ignition of at least one combustible gas in the environment is determined based on the thermal data. At least one action is triggered based on the determined risk of ignition.

According to one embodiment of this aspect, a time-varying thermal profile is determined based on the thermal data where the time-varying thermal profile includes a plurality of characteristics of the thermal data. According to one embodiment of this aspect, the determining of the time-varying thermal profile includes: analyzing the thermal data over a predefined time window, and determining the plurality of characteristics of the thermal data based on the analysis of the thermal data over the predefined time window where the plurality of characteristics correspond to at least one of an autocorrelation over varying lag times, maxima, minima, mean, median, variance, energy, entropy, skewness, fast fourier transform (FFT) coefficients, continuous wavelet transform (CWT) coefficients.

According to one embodiment of this aspect, the risk of ignition corresponds to a predicted time until ignition of at least one combustible gas in the environment. According to one embodiment of this aspect, the at least one action includes triggering an indication in a display associated with a system where the indication includes the predicted time until ignition of at least one combustible gas in the environment. According to one embodiment of this aspect, state estimation is used to track a predicted risk state of the risk of ignition for the environment based on a distribution of risk classes.

According to one embodiment of this aspect, the thermal data corresponds to a single thermal image of the environment. According to one embodiment of this aspect, the determining of the risk of ignition of at least one combustible gas in the environment includes performing a convolutional neural network classification on the thermal image. According to one embodiment of this aspect, the thermal data includes a plurality of sets of a plurality of thermal images where each set of the plurality of thermal images is captured within a respective time window. According to one embodiment of this aspect, the determining of the risk of ignition of at least one combustible gas in the environment includes performing a recurrent convolutional neural network classification on the set of a plurality of thermal images captured within a respective time window.

According to another aspect of the disclosure, a management device for predicting a flashover event is provided. The management device includes a communication interface configured to receive thermal data associated with an environment. The management device includes processing circuitry in communication with the communication interface where the processing circuitry configured to: classify the thermal data to one of a plurality of classifications of a risk of ignition of at least one combustible gas in the environment where each classification corresponding to a respective predicted time until ignition of at least one combustible gas in the environment, and trigger an indication in a display of a wearable device where the indication including the predicted time until ignition of at least one combustible gas in the environment.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
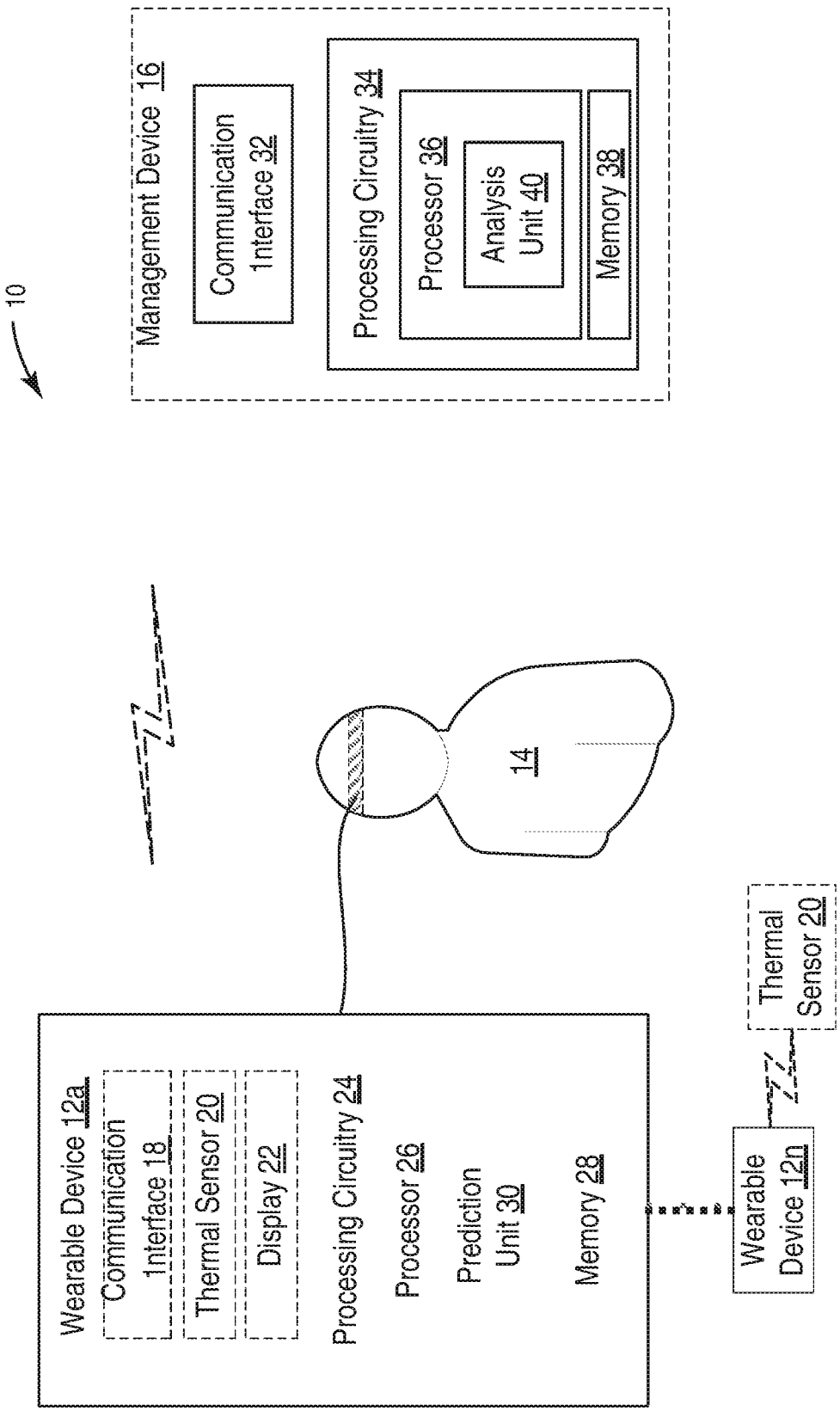
FIG. 1 is a block diagram of the system according to the principles of the disclosure.

Before describing in detail exemplary embodiments, it is noted that the embodiments reside primarily in combinations of apparatus components and processing steps related to a risk classification and warning of predicted flashover events. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like elements are referred to by like reference numerals, there is shown in FIG. 1 a schematic diagram of system 10. System 10 includes one or more wearable devices 12a-12n (collectively referred to as wearable device 12) that may be removably affixed to one or more responders 14. In one example, wearable device 12 is removably affixed/attached to responder 14's head although wearable 14 may be configured to be removably affixed to one or more other parts of responder 14 via one or more mechanism. In one or more embodiments, wearable device 12 may be in communication with optional management device 16. Wearable device 12 may optionally include communication interface 18 configured to perform wireless communications with management device 16. Wearable device 12 may optionally include one or more thermal sensors 20. The thermal sensor 20 may be an active temperature sensor and/or passive temperature sensor. The thermal sensor 20 may be part of wearable device 12, affixed to wearable device 12 or separate from wearable device 12 (illustrated with respect to wireless device 12n). In the embodiment of wireless device 12n, thermal sensor 20 may be in wired and/or wireless communication with wearable device 12n.

In one or more embodiments, wearable device 12 includes one or more displays 22 such as a head-up display (HUD), augmented reality based display, and/or other types of user wearable displays. The wearable device 12 further includes processing circuitry 24, which may have storage and/or processing capabilities. The processing circuitry 24 may include a processor 26 and memory 28. In particular, in addition to or instead of a processor, such as a central processing unit, and memory, the processing circuitry 24 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 26 may be configured to access (e.g., write to and/or read from) memory 28, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

The processing circuitry 24 may be configured to control any of the methods and/or processes described herein and/or to cause such methods, and/or processes to be performed, e.g., by the wireless device 12. The processor 26 corresponds to one or more processors 26 for performing the wireless device 12 functions described herein. The wireless device 12 includes memory 28 that is configured to store data, programmatic software code and/or other information described herein. For example, the processing circuitry 24 of the wireless device 12 may include a prediction unit 30 configured to perform at least one action based on a risk of ignition as described herein.

In one or more embodiments, management device 16 includes communication interface 32 that is configured to communicate with wearable device 12, for example, if management device 16 is configured to perform the analysis instead of the wearable device 12. Management device 16 includes processing circuitry 34, which may have storage and/or processing capabilities. The processing circuitry 34 may include a processor 36 and memory 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

The processing circuitry 34 may be configured to control any of the methods and/or processes described herein and/or to cause such methods, and/or processes to be performed, e.g., by the management device 16. The processor 36 corresponds to one or more processors 36 for performing the management device 16 functions described herein. The management device 16 includes memory 38 that is configured to store data, programmatic software code and/or other information described herein. For example, the processing circuitry 34 of the management device 16 may include an analysis unit 40 configured to perform analysis related to the risk of ignition as described herein. Therefore, the analysis related to the risk of ignition may be performed by management unit 16 as described with respect to analysis unit 40 or by wearable device 12 as described with respect to prediction unit 30. It is also contemplated that part of the analysis can be performed by analysis unit 40 and part by prediction unit 30. For example, initial thermal data processing can be performed by prediction unit 30, with the results sent to management device 16. The risk determination algorithm can then be performed by analysis unit 40 with the results then sent back to wearable device 12. Such an arrangement may allow wearable device 12 to use a smaller processor and consume less energy than would be needed if all processing is done by the wearable device 12.

Figure 2:
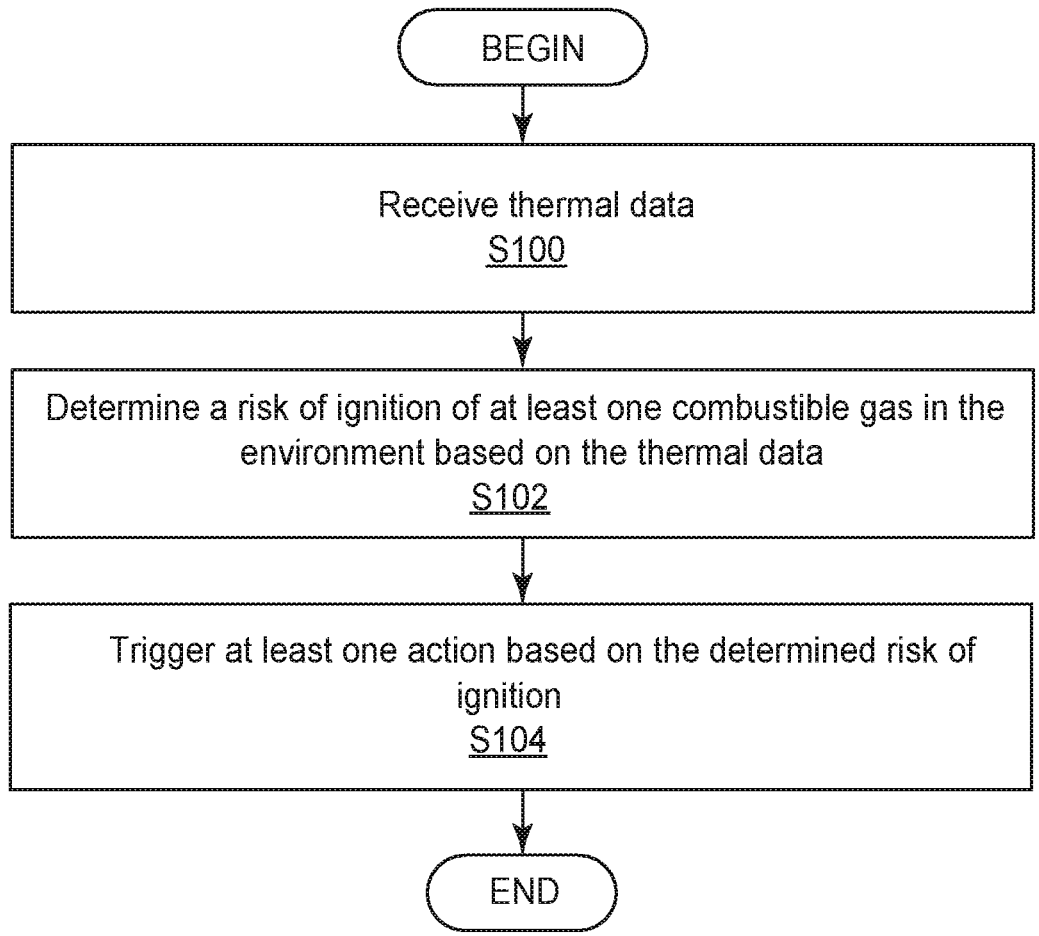
FIG. 2 is a flow diagram of a process for a wearable device according to the principles of the disclosure.

FIG. 2 is a flowchart of an exemplary process of wearable device 12 according to some embodiments, of the present invention. One or more Blocks and/or functions performed by wearable device 12 may be performed by one or more elements of wearable device 12 such as by prediction unit 30 in processing circuitry 24, processor 26, communication interface 18, etc.

In one or more embodiments, wearable device 12, such as via one or more of processing circuitry 24, processor 26 and communication interface 18, is configured to receive (Block S100) thermal data such as from thermal sensors 20. In one or more embodiments, wearable device 12 such as via one or more of processing circuitry 24, processor 26 and communication interface 18 is configured to determine (Block S102) a risk of ignition of at least one combustible gas in the environment based on the thermal data. At least one action is triggered based on the determined risk of ignition (Block S104). Several example embodiments implementing the arrangements provided above are now described.

Example 1

In one or more embodiments, thermal sensor 20 is an infrared (IR) thermal sensor that is configured to capture thermal data/information in the IR thermal sensor's aperture's field of view. In one or more embodiments, the aperture's field of view may correspond to a projected spot (illustrated in FIG. 5) that may provide thermal data including maximal temperature observed in the projected spot. Through measuring the response from thermal sensor 20 over time, temporal gradients in a thermal profile can be generated. The thermal profile may be directly correlated to the risk of ignition of one or more combustible gasses (i.e., risk of flashover) as radiative heating in the environment may expose surfaces (measured via the thermal sensor 20) to the temperature distribution (i.e., thermal data) in a hot-gas layer, which is an indicator for flashover occurrence. In other words, in one or more embodiments, surface thermal data is used as a proxy for the gas layer temperature, where the classification of the risk of ignition is based on the thermal data.

Figure 3:
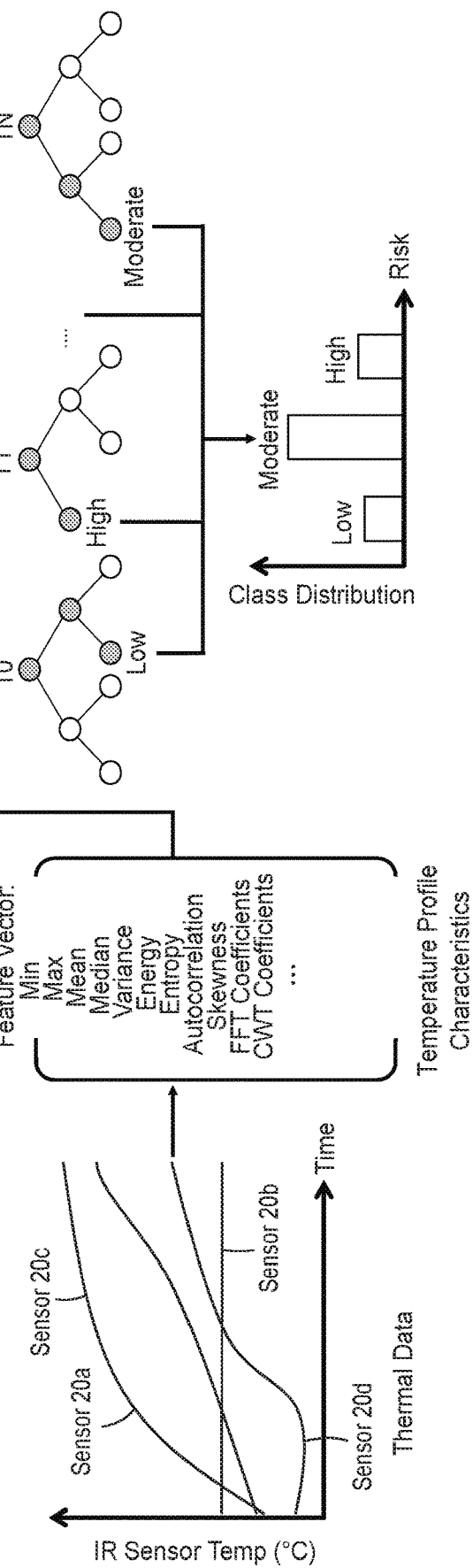
FIG. 3 is a diagram of a time series classification for risk of ignition prediction according to the principles of the disclosure.

A time series classifier (i.e., model and/or algorithm) can be trained to map the time-varying thermal profile measured from an IR thermal sensor 20 to risk of ignition categories for flashover, i.e., thermal data is analyzed over a predefined time window. These risk of ignition categories can be the likelihood of the flashover event occurring, time horizons for when an event may occur, etc. Training data can be generated from real-life experimental fire scenarios and/or through simulations of flashover events. An example of the time series classifier is illustrated in FIG. 3. The algorithm extracts one or more characteristics (i.e., thermal profile) from thermal data for a given window of time series data, such as autocorrelation over varying lag times, maxima, minima, mean, median, variance, energy, entropy, skewness, fast fourier transform (FFT) coefficients, continuous wavelet transform (CWT) coefficients and other characteristics. For example, one or more thermal sensors 20 measure temperature over a predefined time window. For each thermal sensor 20, a characteristics vector is constructed by analyzing the properties of the measured temperature profile.

The algorithm trains a random forest classifier to map these characteristics for the time series onto risk of ignition classes. For example, the characteristics are used by the classifier, a random forest classifier in this example, which defines a mapping between the given characteristics vector and a distribution of risk of ignition classes based on training data. The output of the random forest classifier is a distribution over the available risk of ignition classes to which the time series corresponds. As an example, the risk of ignition classes can be defined as the time horizon to flashover event(s) or as a set of likelihoods for flashover event(s) occurring in a given time horizon (e.g., low/moderate/high probability for flashover to occur in the next 30 seconds).

Figure 4A:
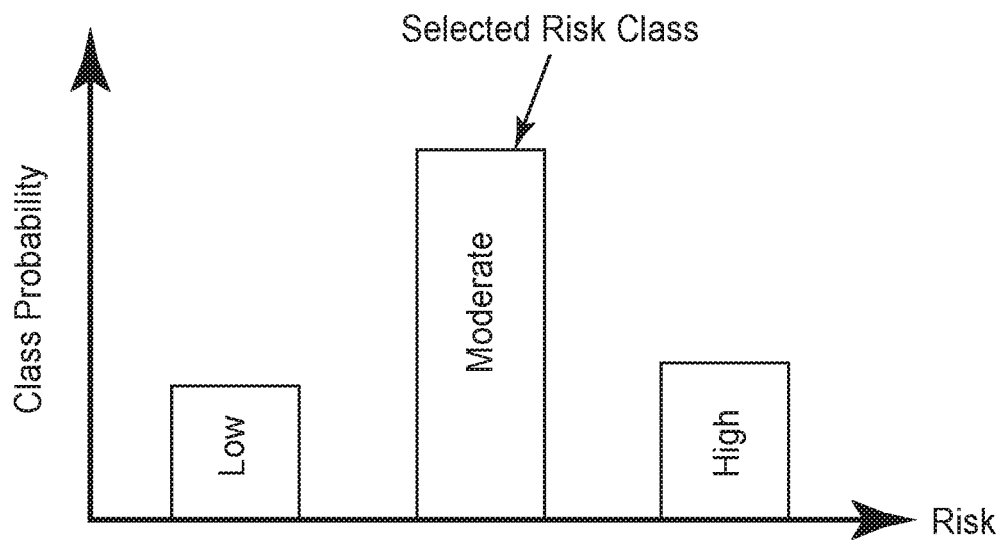
FIGS. 4A-C are diagrams of risk mitigation processes for an output of the time series classification according to the principles of the disclosure.

A variety of alert generation methods can be implemented. In particular, FIGS. 4A-C relate to risk-mitigation policies given aggregated output (weighted or non-weighted) from the ensemble of time series classifiers. As an example, the classifier can be generated to output the levels of the likelihood for a flashover event to occur in the next time interval (classes=[low, moderate, high]). In one or more embodiments, a majority vote scheme may be implemented that aggregates the distribution across classes for selecting the highest probability case as illustrated in the example in FIG. 4A. In FIG. 4A, the highest probability class given by the aggregate distribution as the current risk status for the responder 14 is selected. In this example, the ensemble aggregate models the current risk level of an environment. In practice, a weighted addition of these classes, with increasing weights for higher risk categories, may bias this voting scheme towards identifying dangerous scenarios when only a small portion of the sensor responses indicate a significant risk.

Figure 4B:
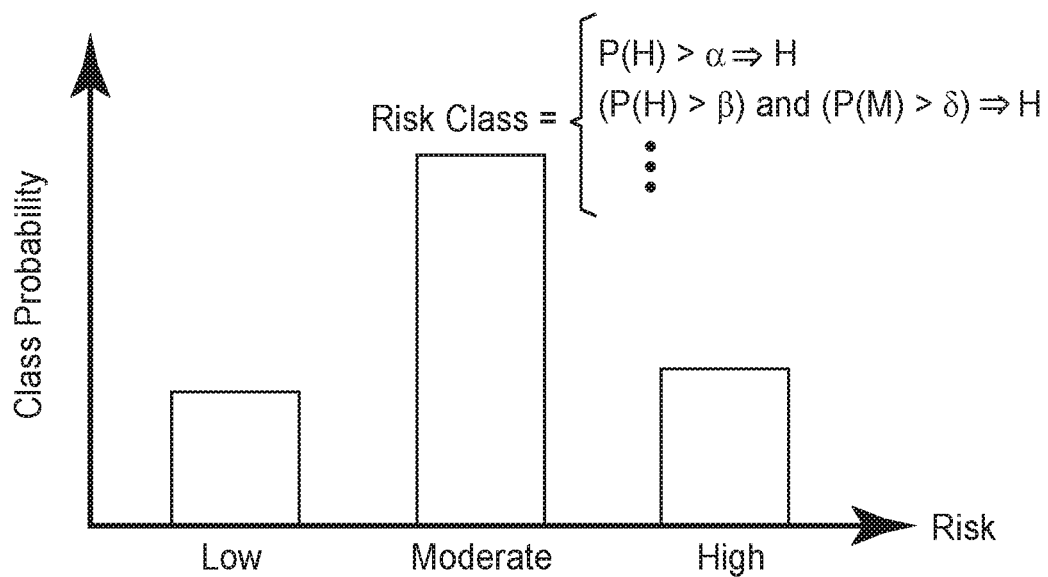

Beyond majority vote, a rules-based policy may be implemented that explicitly looks at the distribution of risk of ignition classes from the weighted or non-weighted aggregated distribution, or on the ensemble of risk distributions across sensors as illustrated in the example in FIG. 4B. In FIG. 4B, the full distribution over classes is analyzed and one or more policies are defined that operate on the full distribution. In this example, the classifier is expected to perform well if the input time series (i.e., thermal data) captures information rich regions of the thermal environment, however due to the spatial sampling distribution, not all sensors may capture information rich regions. As an example, a rule-based policy is derived based on insurance or actuarial tables that provide for methods for optimistic or pessimistic mapping of the class distribution to the environment's risk classes.

Figure 4C:
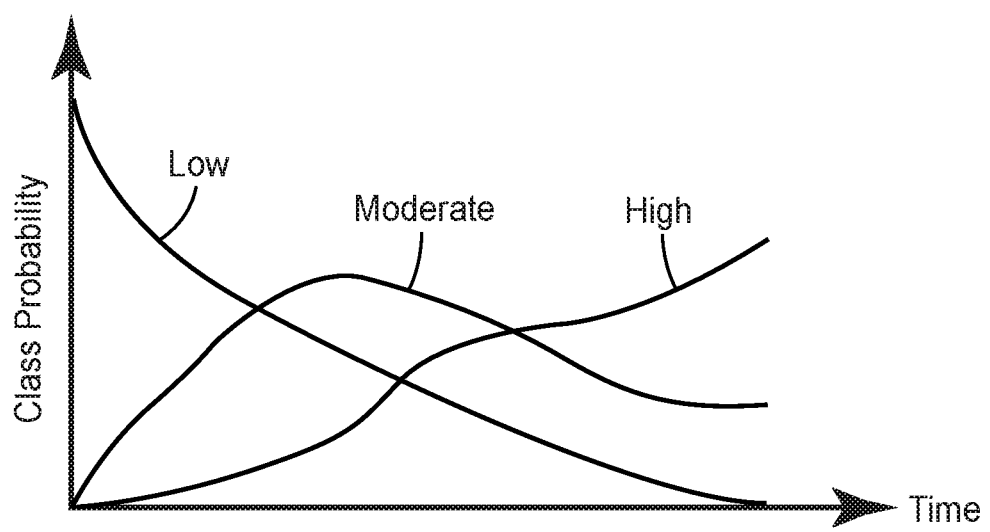

A dynamic risk tracking scheme may analyze the evolution of these aggregated risk categories over time to influence decision making, as a progression from lower to higher risk conditions may be considered in generating such a risk mitigation policy as illustrated in the example in FIG. 4C. For example, high rates of change for the different classes may be indicative of a high risk scenario, offering advanced notice before the risk class is selected by a static policy such as the one illustrated in FIG. 4A.

In one or more embodiments, state estimation algorithms such as Kalman filtering may be implemented to determine the risk of ignition and/or to update a global predicted risk state for the environment by incorporating the distribution of risk classes from the ensemble of IR thermal sensor 20 responses at each time step.

Figure 5:
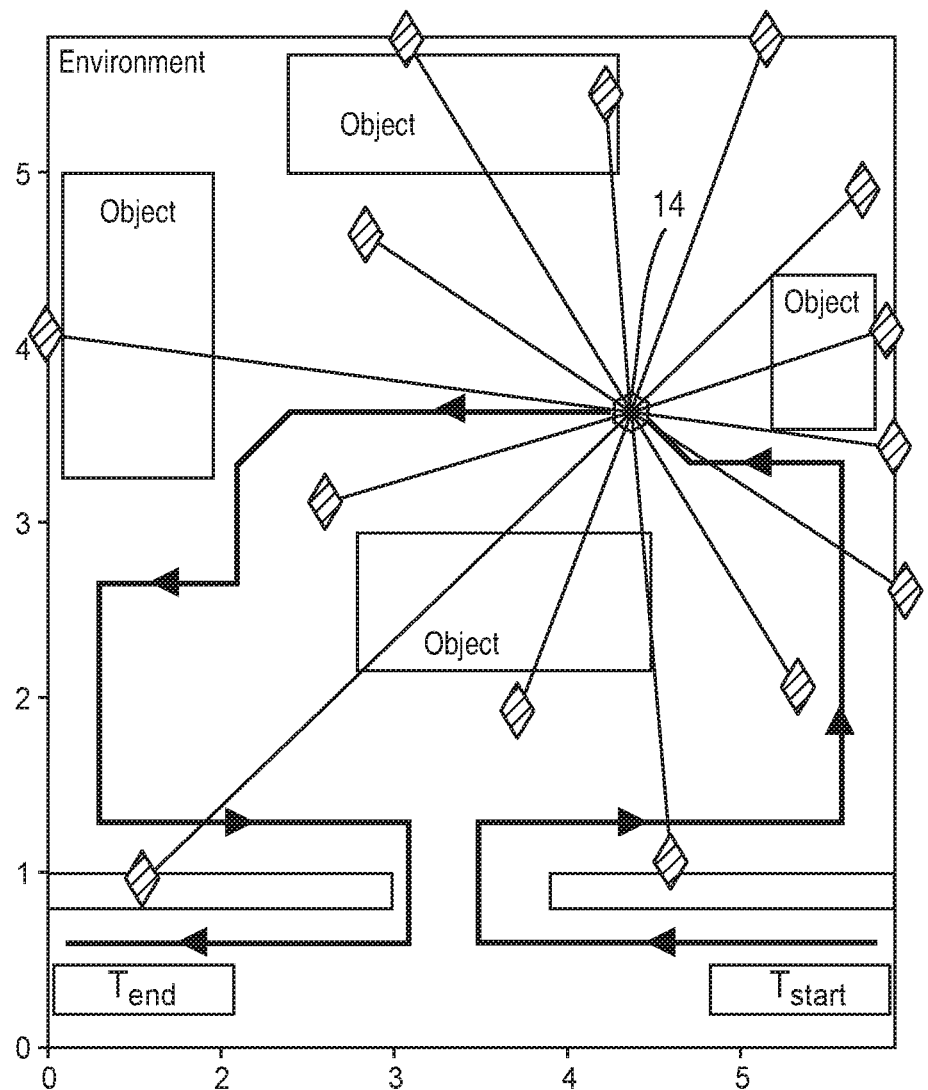
FIG. 5 is a diagram of an environment where flashover prediction is performed according to the principles of the disclosure.

This sensor modality was simulated using simulated flashover events through the National Institute of Standards and Technology (NIST) Fire Dynamics Simulator. Using a ring of IR thermal sensors 20 attached to a helmet, it can then be determined how the distribution of risk classes (in this case the time to flashover) changes for responders 14 performing a search and rescue in a room based on their own movement in the space and the prior build-up of heat by delaying the ingress time as illustrated in FIG. 5. In FIG. 5, IR thermal sensors 20 are used for flashover detection and/or prediction. For example, IR thermal sensors 20 (not shown in FIG. 5 for ease of understanding) are removably attached to responder 14 in which these sensors may perform search pattern(s) in the environment. The path of the responder 14 is illustrated where each diamond attached to a ray emanating out from the responder 14 corresponds to a direction and point of measurement for a particular IR thermal sensor 20, with responder 14 presented as a hexagon.

Figure 6A:
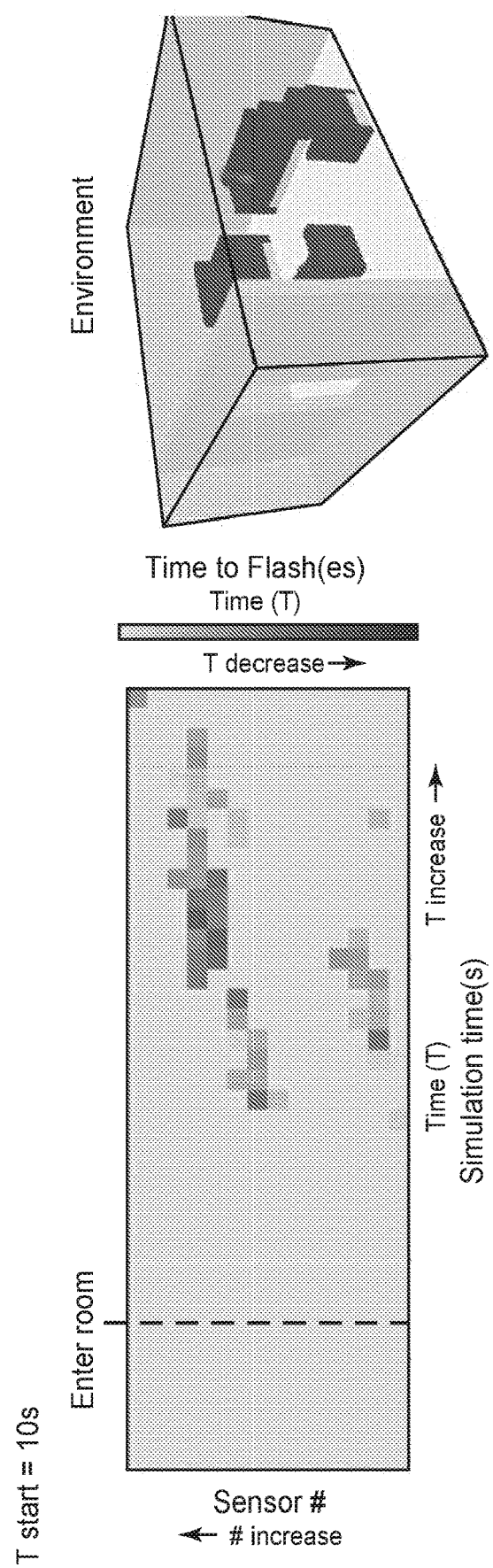
FIGS. 6A-C are diagrams of simulations according to the principles of the disclosure.
Figure 6B:
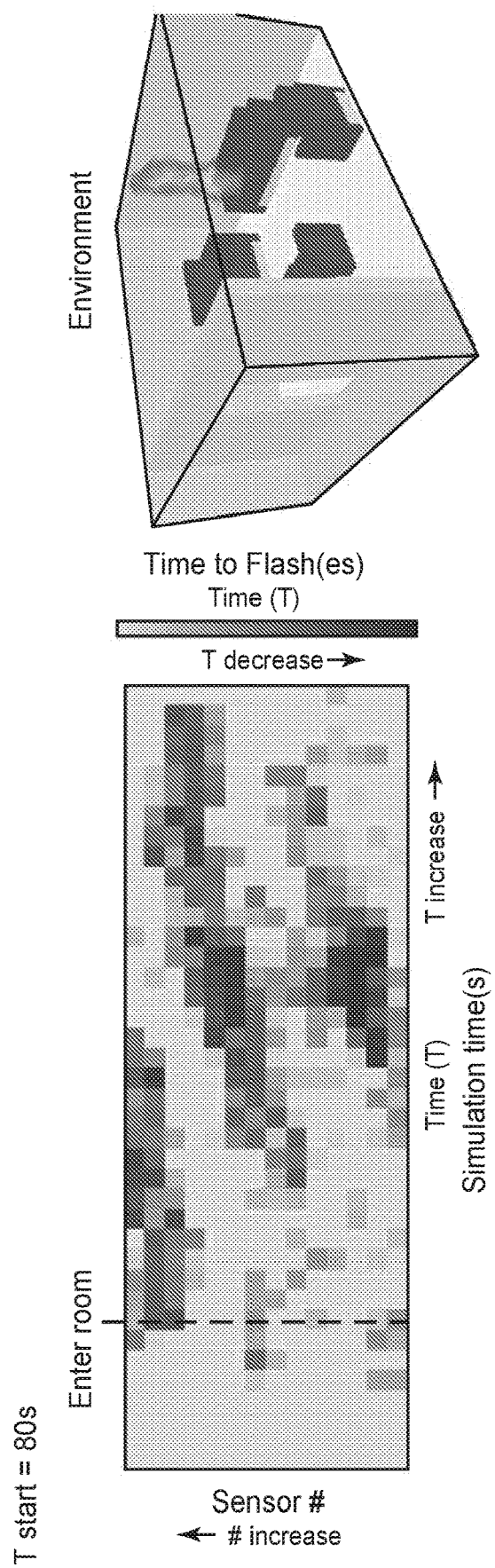
Figure 6C:
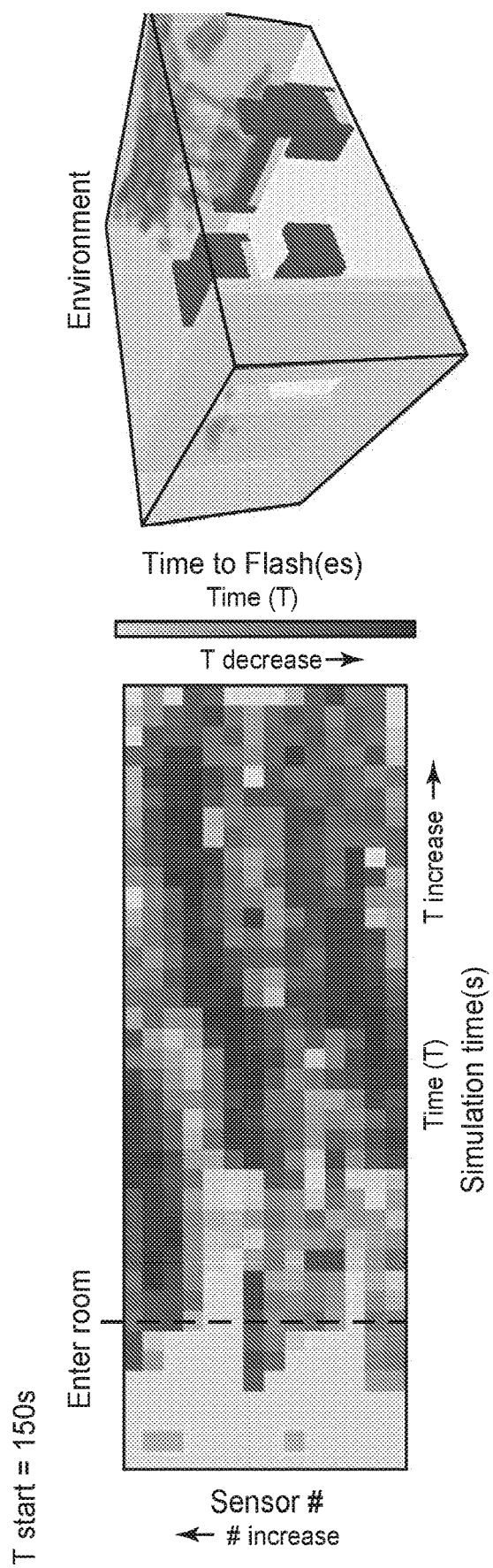

FIGS. 6A-C illustrate three independent sweeps of the room at different starting times by the IR thermal sensors 20 where different levels of fire activity are detected and/or predicted. In one or more embodiments, the scale of T in FIGS. 6A-C is linear and where the units are in seconds, although other timescales and/or time units may be used. In one or more embodiments, the scale of the quantity (#) of sensors is linear and may increase by a predefined quantity of sensors although other quantity scales and/or quantity of units may be used. In one or more embodiments, for each sweep, FIG. 6A-C illustrates the estimated time to flashover for each sensor as a function of time. The light shading corresponds to long durations (e.g., >3 minutes), while the darker shading corresponds to an imminent risk of flashover or risk of ignition (e.g., <10 s). A vertical dashed line represents a point during the search when the responder 14 enters the room/environment. Corresponding images of the fire activity are illustrated on the right hand side of FIGS. 6A to 6C. In FIG. 6A, with a sweep starting at T=10 s, the observed minimal risk is predicted for the responder(s) 14 as they perform this search, owing to the low level of fire involvement. In FIG. 6B, delaying to T=80 s at time of start there is an increased measured risk of ignition (i.e., flashover) across certain regions mapped out by the thermal sensor 20 array as several of the thermal sensors 20 sense regions of potentially high flashover risk. In FIG. 6C, if the start of responders 14 entered the room is delayed T=150 s, the thermal sensors 20 sensor thermal data indicating that flashover is imminent and wearable device 12 may continue to predict this result for the duration of the sweep. For the example, in FIGS. 6A-C, the environment has a flashover time of 159$s$ (i.e., a flashover initiates at 159$s$), thereby illustrating that the classifiers described herein are capable of recognizing the immediate danger of flashover based on thermal data.

Example 2

In one or more embodiments, the thermal sensor 20 is a thermal imaging camera (TIC) that is configured to capture thermal data (i.e., temperature information) in the field of view of the TIC's aperture. The thermal profile generated from the thermal data includes both the distribution of magnitudes and spatial gradient of temperatures in the environment, which are directly correlated to the risk of ignition (i.e., flashover), as radiative heating in the environment may expose surfaces (which are measured via the TIC) to the temperature distribution in the hot-gas layer which is an indicator for flashover. Thus, similar to Example 1, surface thermal data is used as a proxy for the gas layer temperature for risk of ignition prediction.

Figure 7:
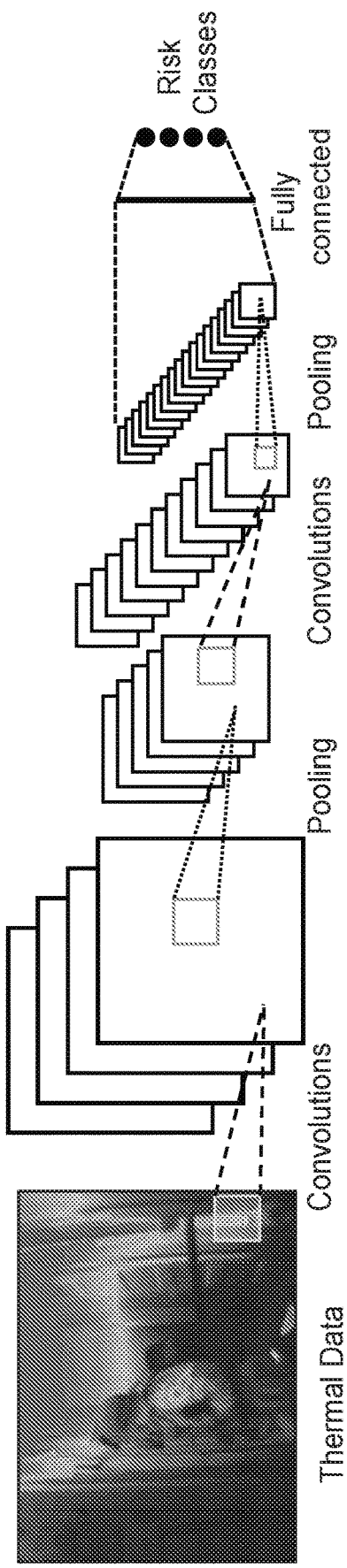
FIG. 7 is a diagram of a convolutional neural network process for flashover prediction according to the principles of the disclosure.

In one or more embodiments, one or more thermal images (i.e., thermal data) are mapped to risk categories for flashover. These risk categories can be the likelihood of the event occurring, time horizons for when an event will occur, etc. In one or more embodiments, the risk classification using the one or more thermal images is performed using a convolutional neural network (CNN) as illustrated in FIG. 7, which constructs one or more characteristics from an image by training a series of convolution kernels that are applied to the image and then maps these characteristics through the network architecture to a distribution over the risk classes as illustrated in FIG. 3. In one or more embodiments, the CNN structure includes alternating convolution and pooling layers that take the image and generate spatially consistent characteristics. Upon generating these relevant characteristics from the image, a set of fully connected layers are then employed to aggregate features together, with a final output layer constructing a distribution over the desired risk classes. As an example, risk classes can be defined as the time horizon to flashover events or as a set of likelihoods for flashover occurring in a given time horizon (e.g., low/moderate/high probability for flashover to occur in the next 30 seconds). Training data can be gathered from both real-life fire studies and/or simulations of flashover events. By adding recurrent layers into the CNN scheme, temporal changes in the thermal environment can be incorporated to provide a dynamic prediction over these risk classes which evolve in time. Alternatively, state estimation algorithms can be implemented that take sequences of predicted risk classes and evolve the estimated risk distribution.

In one or more embodiments, depending on implementation, the selected risk class (FIG. 4A) may be used to trigger the alert or an additional risk-mitigation policy may be applied at the class distribution to generate alerts (FIG. 4B). Dynamic risk tracking may be incorporated by looking at the evolution of risk classes over time from this image classifier, as a progression from lower to higher risk conditions may prove informative in generating a mitigation policy/scheme (FIG. 4C).

Referring back to FIGS. 1 and 2, in one or more embodiments, wearable device 12 such as via one or more of processing circuitry 24, processor 26 and communication interface 18 is configured to trigger (Block S104) at least one action based on the determined risk of ignition. In one or more embodiments, at least one action includes one or more alerts that may be broadcast through a number of different media. In one or more embodiments, wearable device 12 is configured to provide a vibration alarm, e.g., haptic alarm, configured to alert the wearer directly. In one or more embodiments, status indication light(s) and/or audible siren(s) may be implemented in wearable device 12. If a responder 14 possesses an augmented reality system or display screen as part of their personal protection equipment (PPE), visual alerts may be communicated to their display to alert the responder 14 where these visual alerts may include one or more natural language alerts, visual indicators, and color coding. An example of warnings presented for an in-mask or head-mounted display is illustrated in FIGS. 8A and 8B. In one or more embodiments, a boundary region around an image with varying color and/or patterns may be used to indicate a risk of ignition level as illustrated in FIG. 8A. In one or more embodiments, one or more symbols are overlaid onto the image for display and/or the display in which varying color and/or size and/or image characteristic may indicate a risk of ignition as illustrated in FIG. 8B.

According to one embodiment of this aspect, the at least one thermal sensor is a plurality of infrared (IR) sensors in which the thermal data corresponds to thermal data generated by the plurality of IR thermal sensors 20. According to one embodiment of this aspect, the processing circuitry 24 is further configured to determine a time-varying thermal profile based on the thermal data where the time-varying thermal profile includes a plurality of characteristics of the thermal data.

According to one embodiment of this aspect, the determining of the time-varying thermal profile includes: analyzing the thermal data over a predefined time window, and determining the plurality of characteristics of the thermal data based on the analysis of the thermal data over the predefined time window where the plurality of characteristics correspond to at least one of an autocorrelation over a plurality of lag times, maxima, minima, mean, median, variance, energy, entropy, skewness, FFT coefficients, and CWT coefficients. According to one embodiment of this aspect, the risk of ignition corresponds to a predicted time until ignition of at least one combustible gas in the environment. According to one embodiment of this aspect, the at least one action includes triggering an indication in a display associated with the wearable device where the indication includes the predicted time until ignition of at least one combustible gas in the environment.

According to one embodiment of this aspect, the processing circuitry 24 is further configured to use state estimation to track a predicted risk state of the risk of ignition for the environment based on a distribution of risk classes. According to one embodiment of this aspect, the thermal data corresponds to a single thermal image of the environment. According to one embodiment of this aspect, determining a risk of ignition of at least one combustible gas in the environment includes performing a convolutional neural network classification on the thermal image. According to one embodiment of this aspect, the thermal data includes a plurality of sets of a plurality of thermal images, each set of the plurality of thermal images being capture within a respective time window. According to one embodiment of this aspect, the determining of the risk of ignition of at least one combustible gas in the environment includes performing a recurrent convolutional neural network classification on the set of a plurality of thermal images captured within a respective time window.

Figure 9:
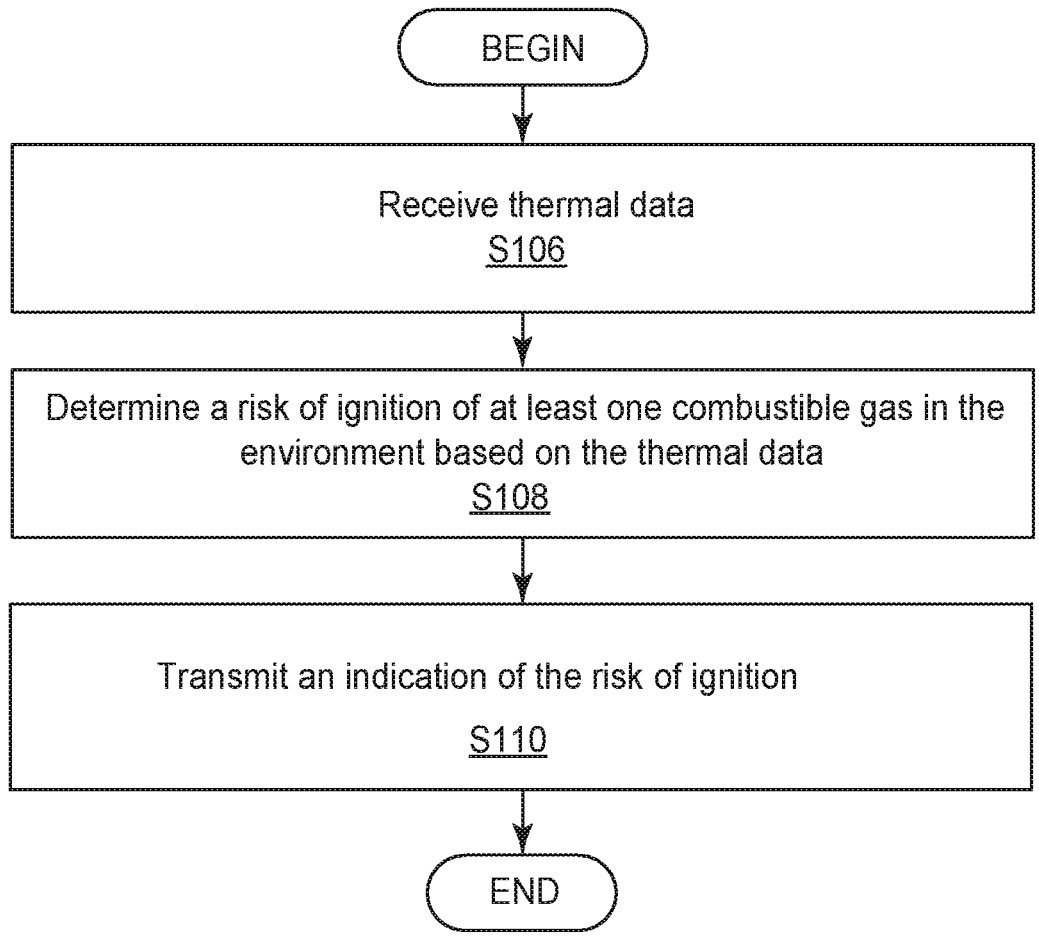
FIG. 9 is a flow diagram of an exemplary process for a management device according to the principles of the disclosure.

FIG. 9 is a flowchart of an exemplary process in a management device 16 according to some embodiments of the disclosure. One or more Blocks and/or functions performed by management device 16 may be performed by one or more elements of management device 16 such as by analysis unit 40 in processing circuitry 34, processor 36, communication interface 32, etc. In one or more embodiments, management device 16 such as via one or more of processing circuitry 34, processor 36 and communication interface 32 is configured to receive (Block S106) thermal data. For example, in one or more embodiments, management device 16 receives thermal data from wearable device 12 such that management device 16 can analyze the thermal data.

Figure 8:
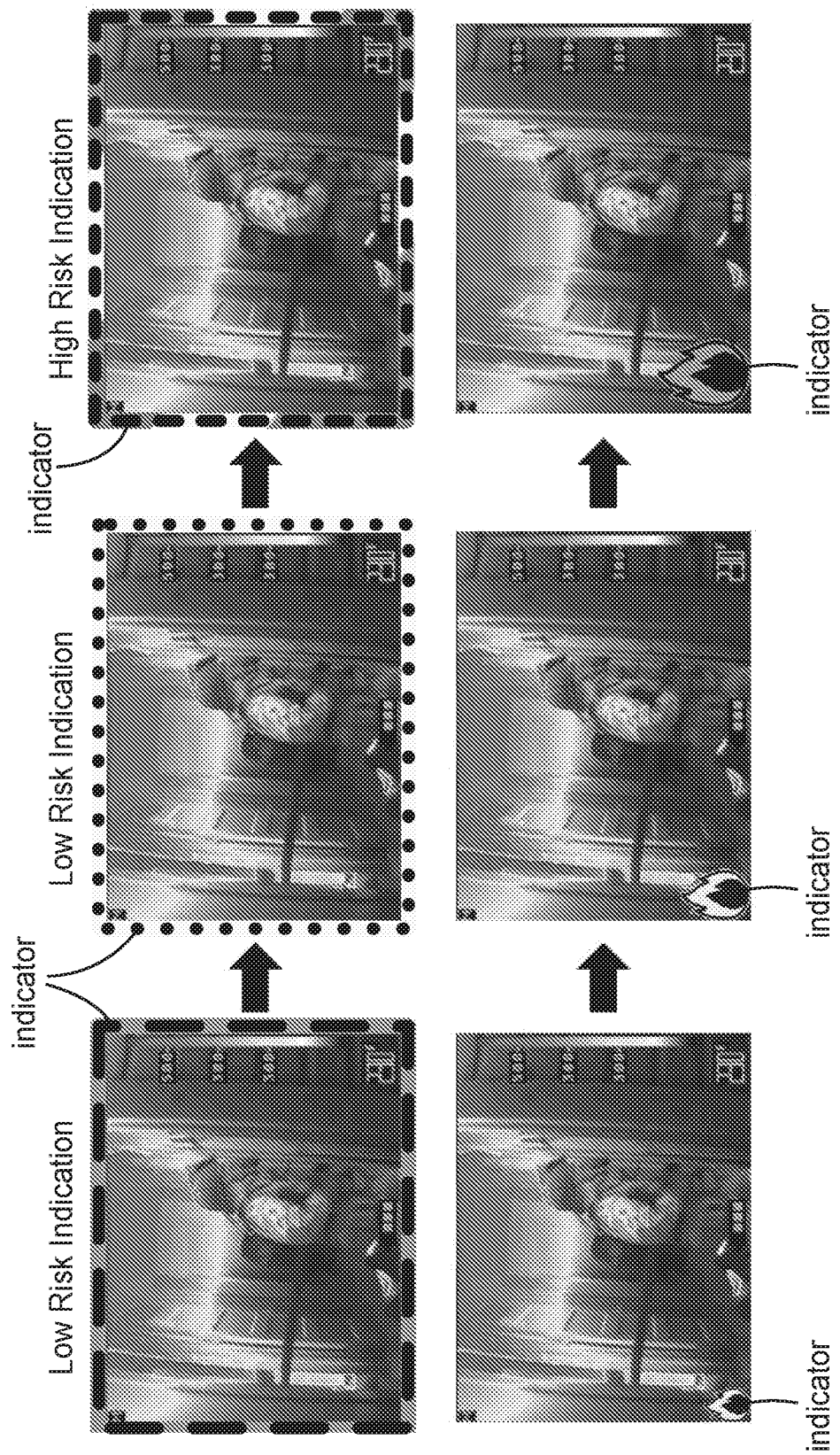
FIG. 8 is a diagram of various indications according to the principles of the disclosure.

In one or more embodiments, management device 16 such as via one or more of processing circuitry 34, processor 36 and communication interface 32 is configured to determine (Block S108) a risk of ignition of at least one combustible gas in the environment based on the thermal data, as described in Block S102. In one or more embodiments, processing circuitry 34, processor 36 and communication interface 32 are configured to classify the thermal data to one of a plurality of classifications of a risk of ignition of at least one combustible gas in the environment where each classification corresponds to a respective predicted time until ignition of at least one combustible gas in the environment, as described herein. In one or more embodiments, management device 16 such as via one or more of processing circuitry 34, processor 36 and communication interface 32 is configured to transmit (Block S110) an indication of the risk of ignition (i.e., flashover). For example, in one or more embodiments, management device 16 transmits an indication of the risk of ignition to the wearable device 12 for display as illustrated in FIG. 8. In one or more embodiments, the transmitted indication may trigger an indication in a display 22 of a wearable device 12 where the indication includes the predicted time until ignition of at least one combustible gas in the environment. In one or more embodiments, prediction unit 30 may be omitted from wearable device 12 if management device 16 is configured to perform an analysis of the thermal data such as in the examples of FIG. 9. In one or more embodiments, management device 16 may be omitted such as if wearable device 12 is configured to perform analysis on thermal data as described with respect to FIG. 2.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A wearable device for predicting a flashover event, the wearable device comprising:
    processing circuitry configured to:
        receive thermal data from at least one thermal sensor, the thermal data being associated with an environment and including a plurality of sets of a plurality of thermal images, each set of the plurality of thermal images being captured within a respective time window;
        determine a time-varying thermal profile based on the thermal data, the time-varying thermal profile including a plurality of characteristics of the thermal data including both a distribution of magnitudes and spatial gradient of temperatures in the environment;
        determine a risk of ignition of at least one combustible gas in the environment based on the thermal data; and
        trigger at least one action based on the determined risk of ignition, the at least one action including triggering an indication in a display associated with the wearable device, the indication including a predicted time until ignition of at least one combustible gas in the environment.

2. The wearable device of claim 1, wherein the at least one thermal sensor is a plurality of infrared (IR) sensors, the thermal data corresponding to data generated by the plurality of IR sensors.

3. The wearable device of claim 1, wherein the determining of the time-varying thermal profile includes:
   analyzing the thermal data over a predefined time window; and
   determining the plurality of characteristics of the thermal data based on the analysis of the thermal data over the predefined time window, the plurality of characteristics corresponding to at least one of an autocorrelation over a plurality of lag times, maxima, minima, mean, median, variance, energy, entropy, skewness, fast fourier transform (FFT) coefficients and continuous wavelet transform (CWT) coefficients.

4. The wearable device of claim 1, wherein the processing circuitry is further configured to use state estimation to track a predicted risk state of the risk of ignition for the environment based on a distribution of risk classes.

5. The wearable device of claim 1, wherein the determining of the risk of ignition of at least one combustible gas in the environment includes performing a recurrent convolutional neural network classification on the set of the plurality of thermal images captured within the respective time window.

6. A method for predicting a flashover event using the wearable device of claim 1, the method comprising:
   receiving the thermal data from the at least one thermal sensor;
   determining the risk of ignition of at least one combustible gas in the environment based on the thermal data; and
   triggering the at least one action based on the determined risk of ignition.

7. The method of claim 6, further comprising determining the time-varying thermal profile based on the thermal data, the time-varying thermal profile including a plurality of characteristics of the thermal data.

8. The method of claim 7, wherein the determining of the time-varying thermal profile includes:
   analyzing the thermal data over a predefined time window; and
   determining the plurality of characteristics of the thermal data based on the analysis of the thermal data over the predefined time window, the plurality of characteristics corresponding to at least one of an autocorrelation over a plurality of lag times, maxima, minima, mean, median, variance, energy, entropy, skewness, fast fourier transform (FFT) coefficients and continuous wavelet transform (CWT) coefficients.

9. The method of claim 6, wherein the risk of ignition corresponds to the predicted time until ignition of at least one combustible gas in the environment.

10. The method of claim 9, wherein the at least one action includes triggering the indication in the display.

11. The method of claim 6, further comprising using state estimation to track a predicted risk state of the risk of ignition for the environment based on a distribution of risk classes.

12. The method of claim 6, wherein the determining of the risk of ignition of at least one combustible gas in the environment includes performing a recurrent convolutional neural network classification on the set of the plurality of thermal images captured within the respective time window.

* * * * *